(12) United States Patent
Kohn

(10) Patent No.: US 11,474,887 B2
(45) Date of Patent: Oct. 18, 2022

(54) ANNOTATION-BASED INTRA-APPLICATION NON-COUPLED MESSAGING FACILITATED BY BYTE-CODE INJECTION AND MANIPULATION

(71) Applicant: REFINITIV US ORGANIZATION LLC, New York, NY (US)

(72) Inventor: David Kohn, Hamilton, NJ (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 0 days.

(21) Appl. No.: 17/484,965

(22) Filed: Sep. 24, 2021

(65) Prior Publication Data
US 2022/0100591 A1  Mar. 31, 2022

Related U.S. Application Data

(60) Provisional application No. 63/083,587, filed on Sep. 25, 2020.

(51) Int. Cl.
*G06F 9/54* (2006.01)

(52) U.S. Cl.
CPC .............. *G06F 9/546* (2013.01); *G06F 9/542* (2013.01)

(58) Field of Classification Search
CPC . G06F 9/465; G06F 9/54; G06F 9/546; H04L 41/0233; H04L 41/06; H04L 41/0604
USPC ................. 719/313, 315, 316, 318
See application file for complete search history.

(56) References Cited

U.S. PATENT DOCUMENTS

| | | | | |
|---|---|---|---|---|
| 8,874,667 | B2 * | 10/2014 | Edwards | ............... H04L 67/55 709/224 |
| 9,762,405 | B2 * | 9/2017 | Miller | .................. H04L 67/63 |
| 11,068,282 | B2 | 7/2021 | Kohn | |
| 2006/0251095 | A1 | 11/2006 | Kukoleta et al. | |

OTHER PUBLICATIONS

International Search Report and Written Opinion dated Dec. 14, 2021, issued in International Patent Application No. PCT/IB2021/058726, 14 Pages.

* cited by examiner

*Primary Examiner* — Andy Ho
(74) *Attorney, Agent, or Firm* — Pillsbury Winthrop Shaw Pittman, LLP

(57) ABSTRACT

Intra-application messaging that is non-coupled may be facilitated through byte code injection. For example, a consumer class may be annotated with an annotation that describes data with which the function is to be called to consume data. A producer class may annotate a field/variable of an annotation to indicate that the data is generated by the producer class. At run time, a customized class loader scans each class as it is loaded for these annotations. When a consumer class is found, a byte code injector may write byte code that registers a consumer object instantiated from the consumer class to receive the data from a message router. When a producer class is found, a byte code injector may write byte code that notifies the message router that the data is available.

20 Claims, 7 Drawing Sheets

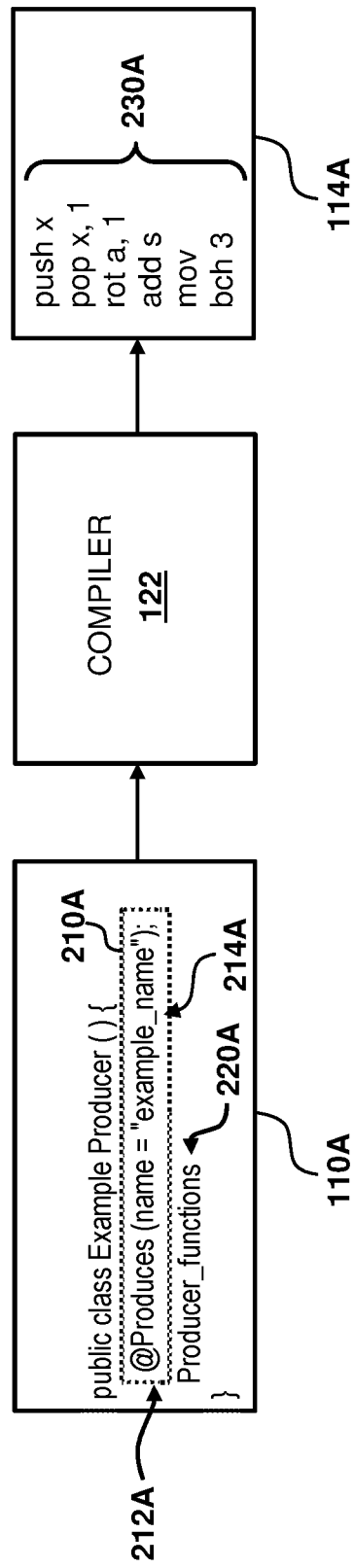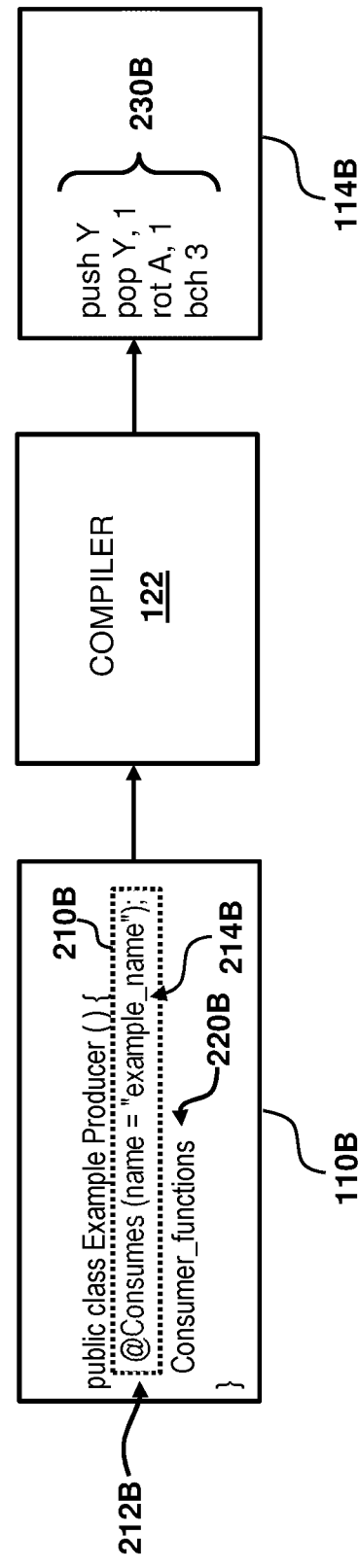
FIG. 2A
FIG. 2B

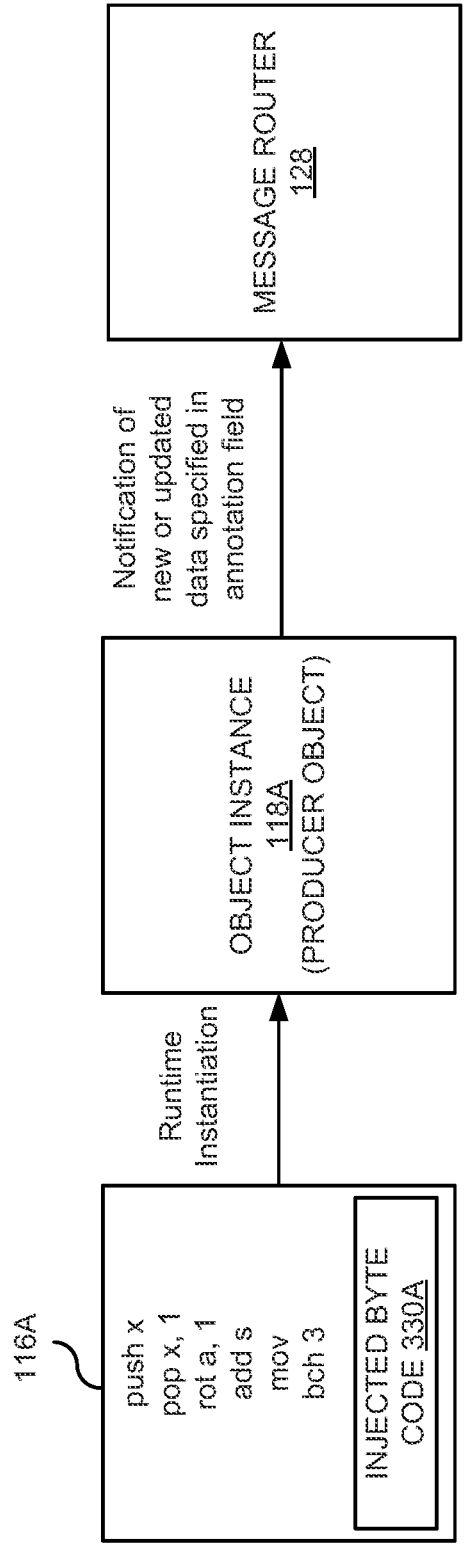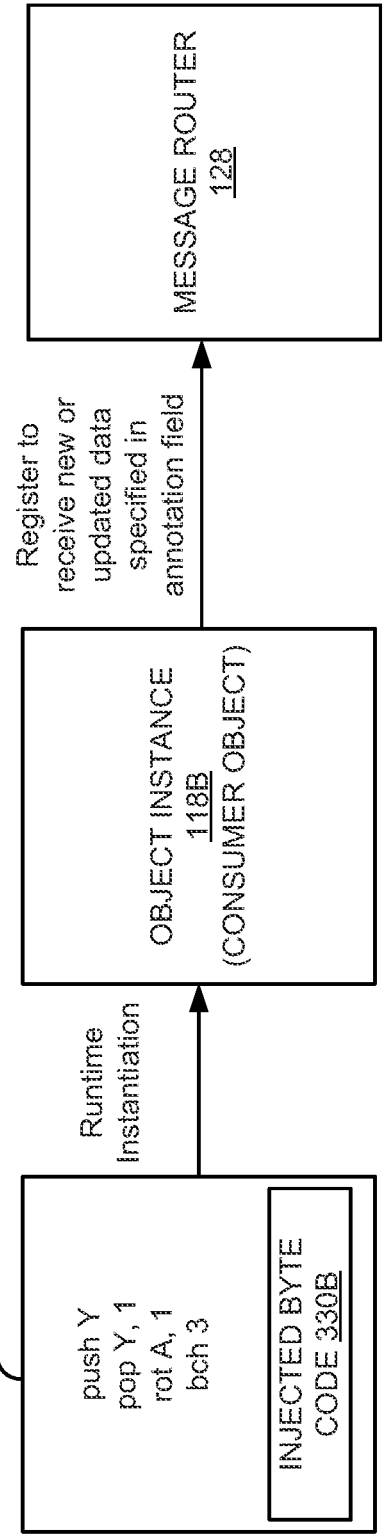

ANNOTATION-BASED INTRA-APPLICATION NON-COUPLED MESSAGING FACILITATED BY BYTE-CODE INJECTION AND MANIPULATION

RELATED APPLICATIONS

This application claims priority to U.S. Provisional Patent Application No. 63/083,587, filed on Sep. 25, 2020, the content of which is incorporated by reference in its entirety herein.

BACKGROUND

In a computer system, intra-application messaging occurs when one part of program code obtains and uses data from another part of the program code. At the application level, intra-application messaging may be performed through event handling/listening. For example, a producer part of the program code may generate data. A consumer part of the program code may implement a listener that listens for the data generated by the producer part. To do so, the consumer part may subscribe to the data generated by the producer part. The producer part may identify each consumer part that subscribed to receive the generated data, and may provide the data to the consumers or notify the consumers that such data is available.

For this technique to work, the listener needs to be able to locate the producer part in the code base—not just the filename, but also a reference to an instance of the producer part, and then needs to implement a specific listener interface. The foregoing creates a tight coupling between the producer and the consumer/listener. However, this coupling is often not possible because of responsibility partitioning. Furthermore, such coupling may cause the program code to fail if the interface changes without corresponding changes to the consumer/listener that uses the interface. In some instances, to avoid this complication, the consumer part may be programmed to re-implement methods of the producer part, resulting in code duplication. In turn, code duplication results in system inefficiencies and increases the technical debt, or likelihood of defects, in the program code.

SUMMARY

The disclosure relates to systems, methods, and computer-readable media of intra-application messaging that is non-coupled. For example, a computer system may facilitate sending data to any part of the application from any other part of the application without requiring a producer of the data nor the consumer to know anything about each other. More specifically, a consumer object instantiated from a class that consumes the data may obtain the data without the use of an interface implemented by an event handler. Thus, the computer system may be improved to facilitate intra-application messaging that is non-coupled, which may, among other benefits, reduce code complexity and potential for error, improve the scalability of the code base, and provide an efficient non-duplicative computer environment.

The computer system may facilitate intra-application messaging that is non-coupled through byte code injection. For example, a function in a class may be annotated with an annotation that describes data with which the function is to be called. Such class and its annotated function may be referred to as a consumer class. The consumer class may be instantiated as a consumer object. Another (or even the same) class may annotate a field/variable of an annotation to indicate that the data is generated by this other (or even the same) class, which may be referred to as a producer class. The producer class may be instantiated as a producer object. At run time, a customized class loader scans each class for these annotations as the class is loaded for execution. When a consumer class is found, a byte code injector may write byte code into the consumer class's constructor, which directs the consumer class, when instantiated into the consumer object, to register itself with a message router. Upon registration, the consumer object instance may be subscribed to receive the data into its annotated function when the data is made available from the producer object.

Similarly, when a producer class is found, the byte code injector may write byte code into the producer class's constructor, which directs the producer class, when instantiated into the producer object, to notify the message router whenever its annotation fields (which specify values for the data) are altered, such as when new or updated data specified in the annotated fields is available. Upon receipt of the notification, the message router may access its list of consumer objects that have registered for that particular data, and then calls each consumer object's annotated function with the data that was produced. In this way, a consumer class may be annotated to include annotations that cause the computer system to automatically inject byte code into the consumer class. The injected byte code causes the consumer object to register with the message router to subscribe to the specified data, regardless of the source of the data and without using specific interfaces that may fail if altered. Likewise, a producer class may be annotated to include annotations that cause the computer system to automatically inject byte code into the producer class. The injected byte code causes the producer object to notify the message router when the specified data is available, regardless of what other parts of the program code may consume the data and without relying on specific interfaces that may fail if altered.

BRIEF DESCRIPTION OF THE DRAWINGS

Features of the present disclosure may be illustrated by way of example and not limited in the following Figure(s), in which like numerals indicate like elements, in which:

FIG. 2A illustrates an example of compiling source code into byte code for a producer class, where the source code has an annotation indicating the producer class produces specified data;

FIG. 2B illustrates an example of compiling source code into byte code for a consumer class, where the source code has an annotation indicating the consumer class consumes the specified data produced by the producer class illustrated in FIG. 2A;

FIG. 4A illustrates a modified class instantiated into an object instance (a publisher object) that notifies the message router when new or updated data is available for publication to consumers to facilitate intra-application messaging that is non-coupled;

FIG. 4B illustrates a modified class instantiated into an object instance registers with the message router to receive new or updated data published from the publisher object;

DETAILED DESCRIPTION

Figure 1:
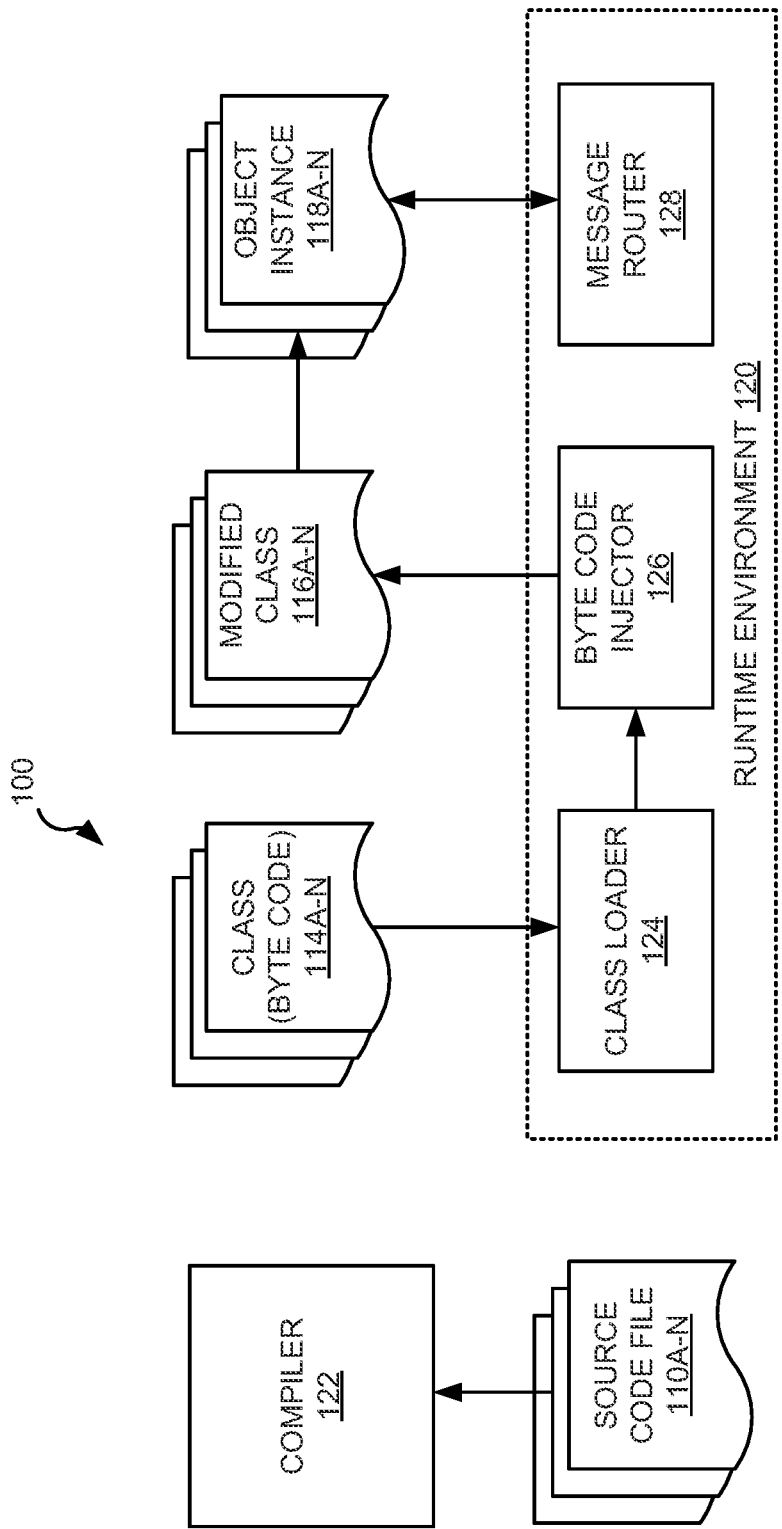
FIG. 1 illustrates an example of a computer system for intra-application messaging that is non-coupled.

Event handling, listening, and reliance on interfaces to provide intra-application data messaging may create a tight coupling between producer and consumer objects. Various issues may arise because of the tight coupling of producer and consumer objects. For example, the program code development overhead inherent in writing many data listeners may make computer systems that use program code unscalable. Furthermore, the coupling introduces inter-package dependencies to allow one class to "listen" to data produced elsewhere. Another issue that may arise is a duplicate code base caused by lack of transparency between disparate aspects of a large code base. Still further, event handling code implements interfaces that, if changed, breaks (renders non-compliable) every class that acts as a listener under that interface. Also, non-standard event producing and listener implementations may occur, resulting in performance inefficiencies across the different implementations.

The disclosure herein may facilitate intra-application messaging that is non-coupled through byte code injection. As such, the disclosure may, among other things, reduce the need for event notification semantics in programs, de-couple the producer and the consumer, reduce or eliminate the need to implement interfaces, and eliminate cross package and module dependencies.

For example, a computer system may automatically inject byte code into classes that are annotated to indicate whether a class is to be instantiated as a producer of data and an identification of the data that it produces. Similarly, a class that consumes data may be annotated to indicate that it consumes data and identification of the data that it consumes. At runtime, once classes are loaded and instantiated, a message router may match producer and consumer objects based on their annotations. For example, the message router may match a producer object with a corresponding consumer object (or vice versa) based on their respective annotations indicating whether the object to be instantiated is a "producer" or a "consumer" and identifying the data that is produced or consumed. For example, the message router may match a first object instantiated from a class having an annotation indicating that it is a producer that produces "stock quote data" and a second object instantiated from a class having an annotation indicating that it is a consumer that consumes "stock quote data." In this way, annotations of each class will result in data production (provision) or consumption based on annotations within the class, matched by the message router, without reliance on the use of an interface used by a consumer object to access data produced from a producer object. In this way, a producer object need not specify an interface to access its produced data, which de-couples messaging within an application from the consumer object that consumes the produced data. Having described a high-level overview of the disclosure, attention will now turn to various examples that facilitate these and other operations.

FIG. 1 illustrates an example of a computer system 100 for intra-application messaging that is non-coupled. The term "intra-application messaging" as used herein may refer communication of data between portions, such as classes, of a computer program loaded together for runtime execution. The term "non-coupled" may refer to a decoupling of producer and consumer objects in a way that does not require the consumer object and the producer object to identify one another. In practical terms, non-coupled may refer to an ability of the consumer object to obtain data from a producer object without having to use an interface implemented by event handlers that otherwise would be used to provide the data to the consumer object. The term "byte code injection" may refer to automatically writing byte code into existing byte code that has been compiled from source code and/or automatically modifying the existing byte code. Byte code injection may therefore add or otherwise modify functionality of byte code compiled from source code, which may be written by a user such as a software developer. In this way, byte code injection as used herein may automatically facilitate intra-application messaging that is non-coupled without the source code having to define or use interfaces to provide or consume data produced by a producer object.

The computer system 100 may include a compiler 122, a class loader 124, a byte code injector 126, a message router 128, and/or other components. The computer system 100 may provide a runtime environment 120 for which one or more components of the computer system 100 may operate. Examples described herein will refer to a JAVA runtime environment as an example of the runtime environment 120. For example, the computer program may be a JAVA Virtual Machine ("JVM") compliant computer program being executed from within a first running JVM instance. An annotation may be metadata included in source code. In JAVA, an annotation may be indicated by an "@" symbol along with one or more annotation fields. The annotation can be used on different aspects of JAVA source code depending upon its definition, such as methods (functions), fields (variables), classes, etc. The JVM is an abstraction of a computer that uses JAVA as well as machine-specific microprocessor (such as x86 Intel Core i7) assembly language, and acts as an interpreter between them. A class loader is a part of the JAVA runtime environment that locates a specific class at run-time, loads the class into the JVM's memory, and readies it for use.

Other types of runtime environments associated with other programming languages that can use byte code injection described herein may be used as well or instead. For example, other types of computer programs may be used, such as a Visual C#™, a Python™, a Kotlin™, Groovy™, or a Closure™ computer program being executed from within a virtual machine in memory.

A user such as a software developer may write source code that defines functions for a computer program. The computer program may be executed by a processor of the computer system 100 to perform functions defined by the source code. Source code may be stored in source code files 110 (illustrated as source code files 110A-N). For example, a source code file 110 may be stored as a ".java" source code file.

The compiler 122 may compile source code files 110 into corresponding classes 114 (illustrated as classes 114A-N). For example, the compiler 122 may compile source code of each source code file 110 into byte code stored in corresponding classes 114. Each class 114 may be stored as a class file in a storage device of or accessible to the computer system 100. For example, a class file may be stored as a ".jar" class file. Each class 114 may be used to instantiate corresponding objects (not illustrated) that perform functions defined by the class 114, which was compiled from a source code file 110. Examples of source code files 110 and their contents (including annotations that facilitate non-coupled intra-application messaging) will be discussed later with reference to FIGS. 2A and 2B below.

At runtime, to execute a computer program, the class loader 124 may access a plurality of classes 114 associated with the computer program and load the classes for execution. For example, the class loader 124 may load the plurality of classes 114 to a JVM for execution by the JVM. In association with loading the plurality of classes 114, the class loader 124 may scan each class of the plurality of classes 114 for an annotation. When an annotation is identified, the class loader 124 may provide a notification to the byte code injector 126 to inject appropriate byte code into a corresponding class 114 to generate a corresponding modified class 116 (collectively illustrated with other modified classes as modified classes 116A-N). Further details of byte code injection will be discussed later with reference to FIGS. 3 and 4. The message router 128 may use the injected byte code of a modified class 116 to recognize and match producer objects and consumer objects so that consumer objects are provided with data, specified in the annotations, from producer objects that produce the specified data. Further details of such provision of data will be described later with reference to FIG. 6.

Reference will now be made to FIGS. 2A and 2B for a discussion of an example of the content of source code files 110 and annotations that facilitate byte code injection for non-coupled intra-application messaging.

Referring first to FIG. 2A, source code file 110A may include an annotation 210A. The annotation 210A may include an annotation field 212A and an annotation field 214A. Other annotation fields (not illustrated) may be included as well or instead. The annotation field 212A includes a value "@Produces" indicating that the source code file 110A is to be compiled into a class that is associated with a producer object. The annotation field 214A is a name field that includes a value "example_name" that identifies data to be produced by the producer object. Source code file 110A may include one or more functions 220A ("producer_functions") that defines functionality of the producer object, which may include generating or otherwise providing data. For example, the producer object may provide or update stock quote data based on the one or more functions 220A. Other types of data may be provided as well or instead. The resulting class 114A may include byte code 230A ("push x; pop x, 1; rot a, 1; add s; mov; bch 3") compiled from the source code in the source code file 110A.

Referring now to FIG. 2B, source code file 110B may similarly include an annotation 210B. The annotation 210B may include an annotation field 212B and an annotation field 214B. Other annotation fields (not illustrated) may be included as well or instead. The annotation field 212B includes a value "@Consumes" indicating that the source code file 110B is to be compiled into a class that is associated with a consumer object. The annotation field 214B is a name field that includes a value "example_name" that identifies data to be consumed by the consumer object. In this way, a user such as a software developer may write annotations 210B to define which data to be consumed from a producer object, without the use of interfaces of the producer object, as will be described with reference to the message router 128. Source code file 110B may include one or more functions 220B ("consumer_functions") that defines functionality of the consumer object, which may include generating displays or analysis of stock quote data provided by the producer object. The resulting class 114B may include byte code 230B ("push Y; pop Y, 1; rot A, 1; bch 3") compiled from the source code in the source code file 110B.

The particular byte code examples in FIGS. 2A and 2B are provided for illustrative purposes. As would be appreciated, in JAVA, byte code may be formatted into stacks that are executed in byte order of the stack. Each class 114 may also include an indication of any annotation 210 from corresponding source code files 110.

Figure 3:
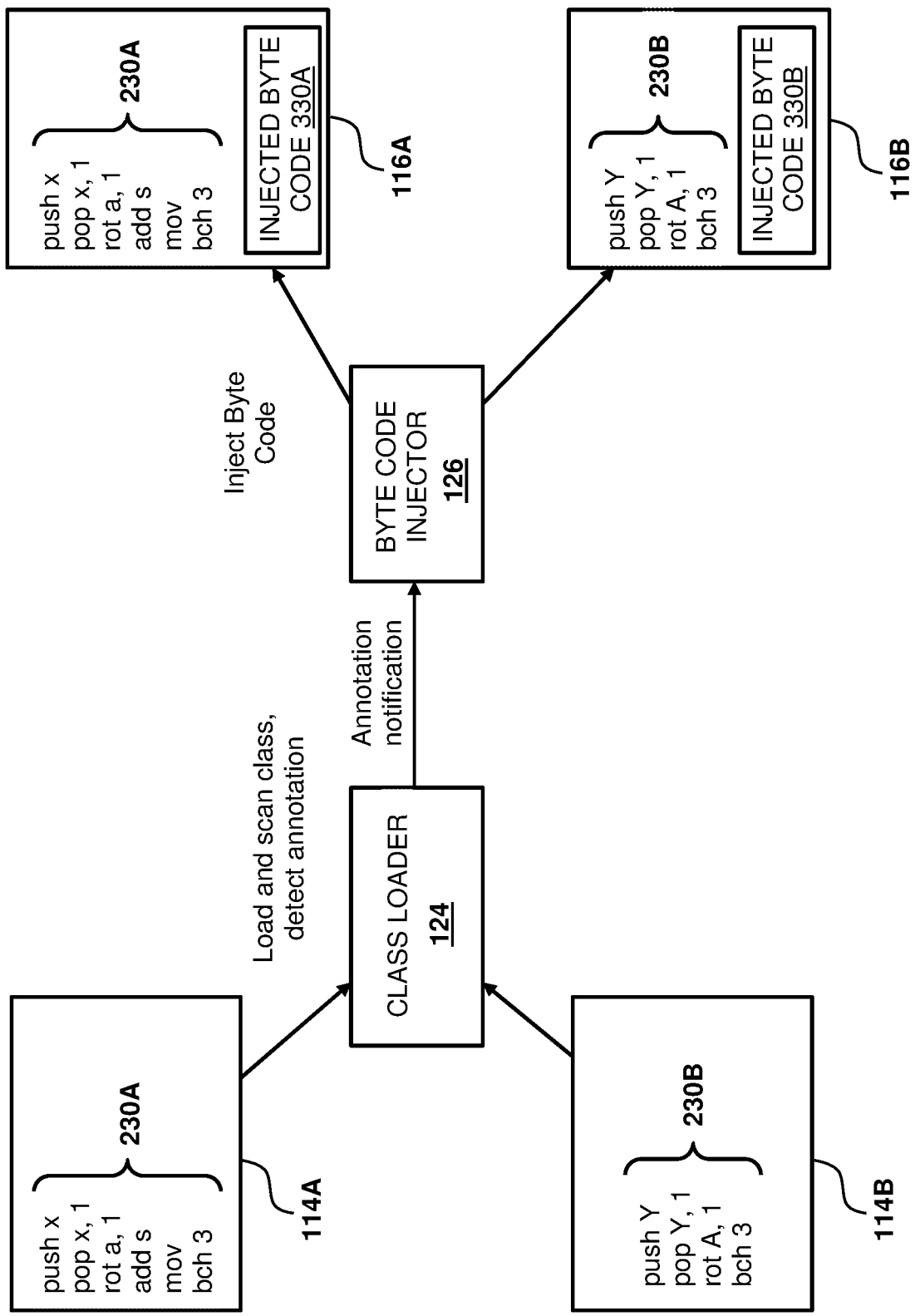
FIG. 3 illustrates an example of scanning classes for the annotations illustrated in FIGS. 2A and 2B and injecting byte code into the classes based on detection of the annotations.

Reference will now be made to FIG. 3 for a discussion of scanning each class of the plurality of classes 114 for annotations 210 and injecting byte code into the classes to facilitate non-coupled intra-application messaging. For example, FIG. 3 illustrates loading, scanning, and injecting respective injected byte code 330 (illustrated as injected byte code 330A and 330B) into classes 114A and 114B to generate modified classes 116A and 116B. It should be noted that the JVM may make the annotations 210A, 210B available to the class loader 124, as would be appreciated.

Upon detection of an annotation 210A associated with a class 114A, the class loader 124 may provide an annotation notification to the byte code injector 126. The byte code injector 126 may include injected byte code 330A with class 114A to generate a modified class 116A that includes the injected byte code 330A. For example, the modified class 116A may include the injected byte code 330A in the class's constructor, which directs the modified class 116A, when instantiated into an object instance 118A, to notify the message router 128 whenever data for its annotation field 214A has been updated or is otherwise new, as illustrated in FIG. 4A.

Similarly, upon detection of an annotation 210B associated with a class 114B, the class loader 124 may provide an annotation notification to the byte code injector 126. The byte code injector 126 may include injected byte code 330B with class 114B to generate a modified class 116B that includes the injected byte code 330B. For example, the modified class 116B may include the injected byte code 330B in the class's constructor, which directs the modified class 116B, when instantiated into an object instance 118B, to register with the message router 128 to receive data specified in its annotation field 214B, as illustrated in FIG. 4B.

Figure 5:
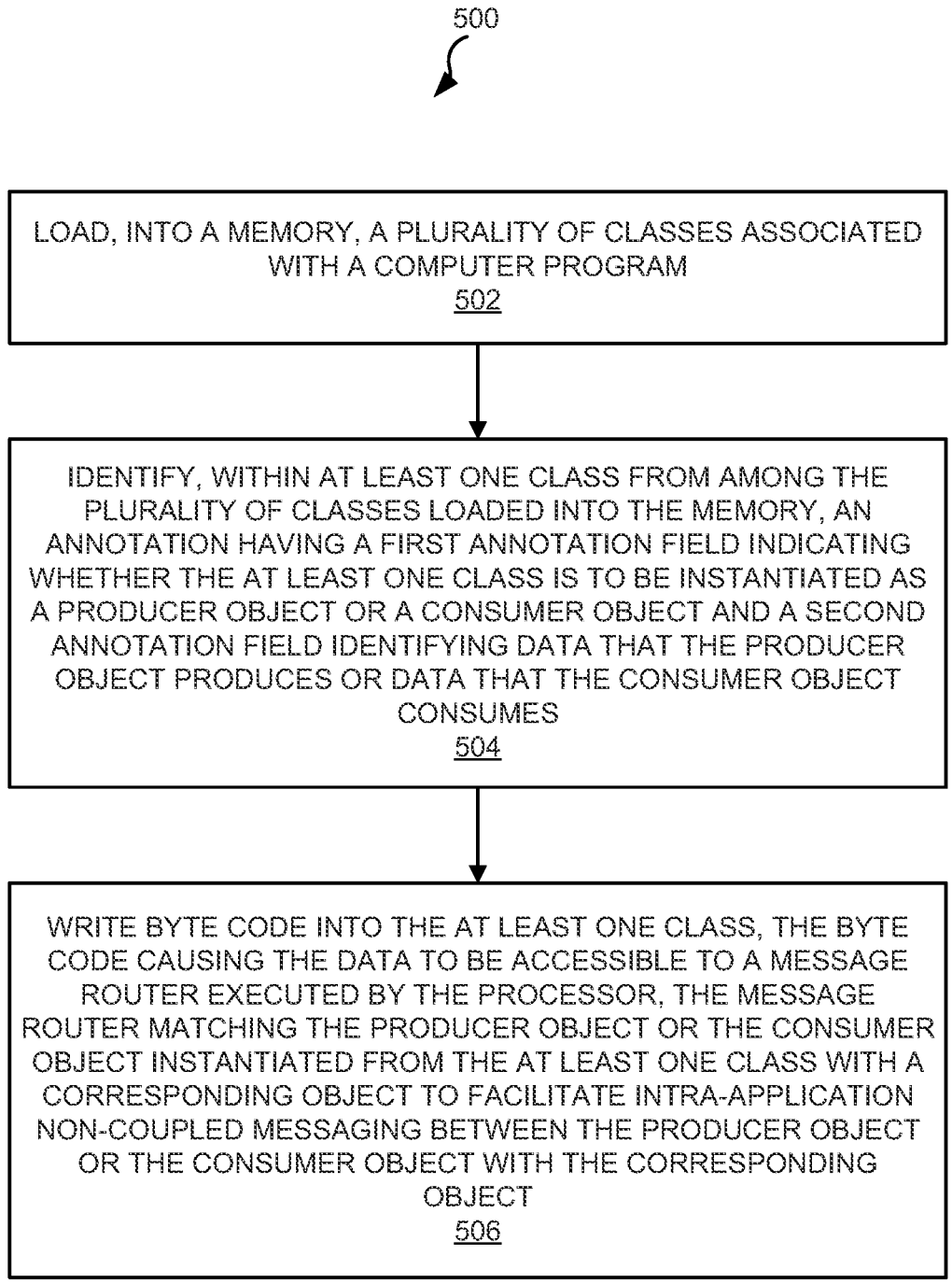
FIG. 5 illustrates an example of a method of intra-application messaging that is non-coupled.

FIG. 5 illustrates an example of a method 500 of intra-application messaging that is non-coupled. For illustrative purposes, method 500 will be described with reference to FIG. 1 in the context of a computer system 100 that facilitates intra-application messaging that is non-coupled through byte code injection responsive to annotations scanned and detected in classes that may be loaded at runtime.

At 502, the method 500 may include loading, into a memory of a computer system (such as computer system 100), a plurality of classes (such as classes 114A-N) associated with a computer program.

At 504, the method 500 may include identifying, within at least one class from among the plurality of classes loaded into the memory, an annotation (such as an annotation 210A or an annotation 210B) having a first annotation field (such as a value of annotation field 212A or 212B) indicating whether the at least one class is to be instantiated as a producer object (such as object instance 118A) or a consumer object (such as object instance 118B) and a second annotation field (such as a value of an annotation field 214A or 214B) identifying data that the producer object produces or data that the consumer object consumes.

At 506, the method 500 may include writing byte code (such as injected byte code 330A or 330B) into the at least one class, the byte code causing the data to be accessible to a message router (such as message router 128) executed by the processor, the message router matching the producer object or the consumer object instantiated from the at least one class with a corresponding object to facilitate intra-application messaging that is non-coupled between the producer object or the consumer object with the corresponding object. For example, the written byte code may cause the data to be accessible to the message router by notifying the message router that the data is new or updated and is available (in the case of a producer object) or by registering with the message router to receive the data (in the case of a consumer object).

Figure 6:
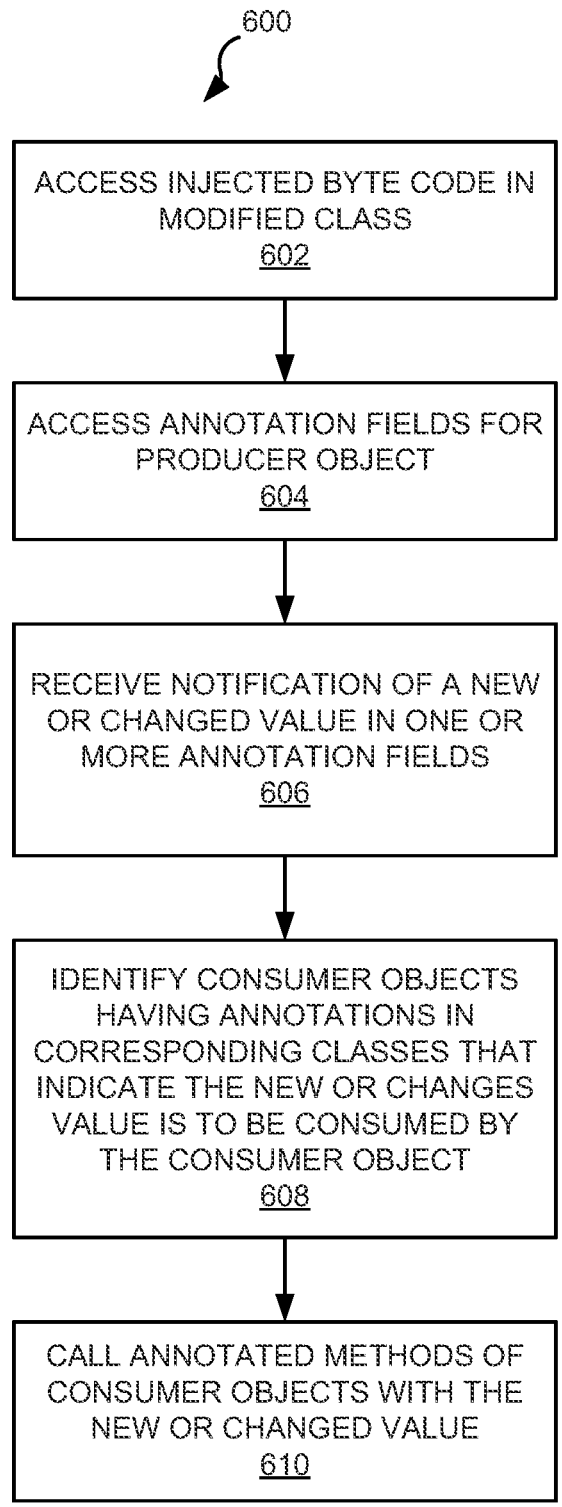
FIG. 6 illustrates an example of a method of calling an annotated function of an instantiated consumer object based on annotations of a class and byte code injection into the class.

FIG. 6 illustrates an example of a method 600 of calling an annotated function of an instantiated consumer object based on annotations of a class and byte code injection into the class. Various examples in the method 600 will be discussed with reference to FIG. 1 for illustrative purposes.

At 602, the method 600 may include accessing injected byte code in a modified class (such as a modified class 116). For example, the class loader 124 may access modified classes 116A-N.

At 604, the method 600 may include accessing annotation fields (such as annotation field 214A) for a producer object (such as object instance 118A instantiated from modified class 116A).

At 606, the method 600 may include receiving a notification of a new or updated value in one or more of the annotation fields. For example, the injected byte code 330A upon instantiation, may notify the message router 128 that new or updated data is available from the producer object.

At 608, the method 600 may include identifying consumer objects (such as object instance 1186) having annotations in corresponding classes that indicate that the new or updated value is to be consumed by the consumer objects.

At 610, the method 600 may include calling an annotated function of the identified consumers objects with the new or updated value. For example, the message router 128 may call one or more functions defined by injected byte code 330B to subscribe to receive the new or updated value. Alternatively, or additionally, the message router 128 may call functions defined by byte code 230A (and/or injected byte code 330B) that use or otherwise consume the new or updated value.

Figure 7:
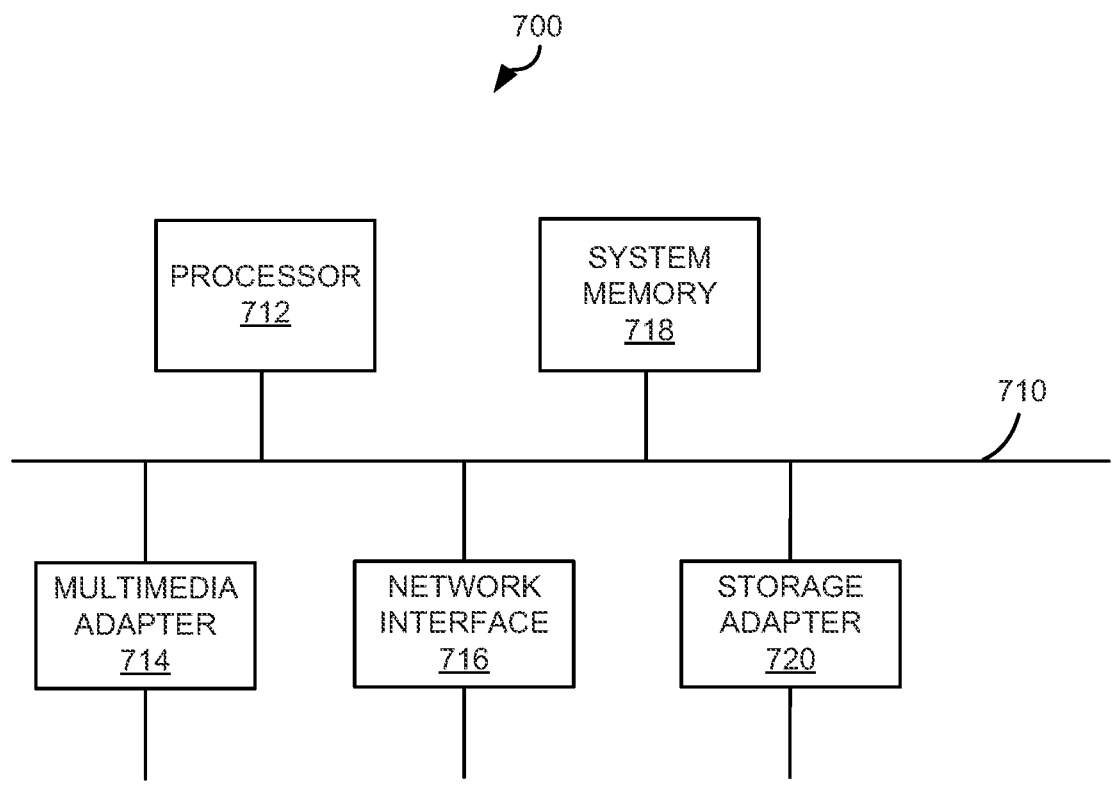
FIG. 7 illustrates an example of a computer system illustrated in FIG. 1.

FIG. 7 illustrates an example of a computer system 700 that may be implemented by the computer system illustrated in FIG. 1. The computer system 700 may include, among other things, an interconnect 710, a processor 712, a multimedia adapter 714, a network interface 716, a system memory 718, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1364 bus, or "firewire," or other similar interconnection element.

In some examples, the interconnect 710 may allow data communication between the processor 712 and system memory 718, which may include read-only memory (ROM) or flash memory (neither shown), random-access memory (RAM), and/or other non-transitory computer readable media (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may control operations of the computer system 700. In some examples, the processor 712 may do so by executing instructions such as software or firmware stored in system memory 7168 or other data via the storage adapter 720. In some examples, the processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 714 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 716 may provide the computer system 700 with an ability to communicate with a variety of remote devices over a network. The network interface 716 may include, for example, an Ethernet adapter, a Fibre Channel adapter, and/or other wired- or wireless-enabled adapter. The network interface 716 may provide a direct or indirect connection from one network element to another, and facilitate communication and between various network elements.

The storage adapter 720 may connect to a standard computer readable medium for storage and/or retrieval of information, such as a fixed disk drive (internal or external).

Other devices, components, elements, or subsystems (not illustrated) may be connected in a similar manner to the interconnect 710 or via a network. The network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The devices and subsystems can be interconnected in different ways from that shown in FIG. 7. Instructions to implement various examples and implementations described herein may be stored in computer-readable storage media such as one or more of system memory 718 or other storage. Instructions to implement the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

In FIG. 1, as well as in other drawing Figures, different numbers of entities than those depicted may be used. Furthermore, according to various implementations, the components described herein may be implemented in hardware and/or software that configure hardware.

For simplicity and illustrative purposes, the disclosure included descriptions that may refer to examples. In the description, numerous specific details have been set forth in order to provide a thorough understanding of the present disclosure. It will be readily apparent however, that the disclosure may be practiced without limitation to these specific details. In other instances, some methods and structures have not been described in detail so as not to unnecessarily obscure the present disclosure.

Throughout the disclosure, the term "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A computer system of intra-application messaging that is non-coupled in a computing environment, comprising:
   a processor programmed to:
   load, into a memory, a plurality of classes associated with a computer program;
   identify, within at least one class from among the plurality of classes loaded into the memory, an annotation having a first annotation field indicating whether the at least one class is to be instantiated as a producer object or a consumer object and a second annotation field identifying data that the producer object produces or data that the consumer object consumes; and
   write byte code into the at least one class, the byte code causing the data to be accessible to a message router executed by the processor, the message router matching the producer object or the consumer object instantiated from the at least one class with a corresponding object to facilitate intra-application messaging that is non-coupled between the producer object or the consumer object with the corresponding object.

2. The computer system of claim 1, wherein the first annotation field indicates that the at least one class is to be instantiated as the producer object, and wherein the message router is to obtain the data that the producer object produces from the producer object.

3. The computer system of claim 2, wherein to obtain the data that the producer object producers, the message router receives a notification from the producer object that new or updated data identified in the second annotation field and produced by the producer object is available.

4. The computer system of claim 3, wherein the written byte code, when instantiated as the producer object, causes the producer object to notify the message router of the new or updated data.

5. The computer system of claim 2, wherein the message router is to identify the consumer object to receive the data produced by the producer object and provide the data produced by the producer object to the identified consumer object.

6. The computer system of claim 5, wherein to identify the consumer object to receive the data produced by the producer object, the message router is to access a listing of consumer objects, including the consumer object, that have registered to receive the data produced by the producer object.

7. The computer system of claim 1, wherein the first annotation field indicates that the at least one class is to be instantiated as the consumer object, and wherein the message router is to provide the data that the producer object produces to the consumer object.

8. The computer system of claim 7, wherein the second annotation field identifies the data and the written byte code, when instantiated with the at least one class into the consumer object, causes the consumer object to register with the message router to receive the data from the producer object.

9. The computer system of claim 7, wherein the consumer object obtains the data that the producer object produces without a software interface that accesses the data that the producer object produces.

10. A method of intra-application messaging that is non-coupled in a computing environment, comprising:
    loading, by a processor, into a memory, a plurality of classes associated with a computer program;
    identifying, by the processor, within at least one class from among the plurality of classes loaded into the memory, an annotation having a first annotation field indicating whether the at least one class is to be instantiated as a producer object or a consumer object and a second annotation field identifying data that the producer object produces or data that the consumer object consumes; and
    writing, by the processor, byte code into the at least one class, the byte code causing the data to be accessible to a message router executed by the processor, the message router matching the producer object or the consumer object instantiated from the at least one class with a corresponding object to facilitate intra-application messaging that is non-coupled between the producer object or the consumer object with the corresponding object.

11. The method of claim 10, wherein the first annotation field indicates that the at least one class is to be instantiated as the producer object, the method further comprising: obtaining, by the message router, the data that the producer object produces from the producer object.

12. The method of claim 11, wherein obtaining the data that the producer object producers comprises receiving a notification from the producer object that new or updated data identified in the second annotation field and produced by the producer object is available.

13. The method of claim 12, further comprising:
    notifying, by the producer object when the written byte code is instantiated as the producer object, the message router of the new or updated data.

14. The method of claim 11, further comprising:
    identifying, by the message router, the consumer object to receive the data produced by the producer object; and
    providing, by the message router, the data produced by the producer object to the identified consumer object.

15. The method of claim 14, wherein identifying the consumer object to receive the data produced by the producer object comprises:
    accessing, by the message router, a listing of consumer objects, including the consumer object, that have registered to receive the data produced by the producer object.

16. The method of claim 10, wherein the first annotation field indicates that the at least one class is to be instantiated as the consumer object, the method further comprising:

providing, by the message router, the data that the producer object produces to the consumer object.

17. The method of claim 16, wherein the second annotation field identifies the data, the method further comprising:
registering, by the consumer object when the written byte code is instantiated with the at least one class into the consumer object, with the message router to receive the data from the producer object.

18. The method of claim 16, wherein obtaining, by the consumer object, the data that the producer object produces without a software interface that accesses the data that the producer object produces.

19. A computer readable medium that stores instructions that when executed by a processor, causes the processor to:
load, into a memory, a plurality of classes associated with a computer program;
identify, within at least one class from among the plurality of classes loaded into the memory, an annotation having a first annotation field indicating whether the at least one class is to be instantiated as a producer object or a consumer object and a second annotation field identifying data that the producer object produces or data that the consumer object consumes; and
write byte code into the at least one class, the byte code causing the data to be accessible to a message router executed by the processor, the message router matching the producer object or the consumer object instantiated from the at least one class with a corresponding object to facilitate intra-application messaging that is non-coupled between the producer object or the consumer object with the corresponding object.

20. The computer readable medium of claim 19, wherein the first annotation field indicates that the at least one class is to be instantiated as the producer object, and wherein the message router is to obtain the data that the producer object produces from the producer object.

* * * * *